(12) United States Patent
Smith

(10) Patent No.: US 8,915,675 B1
(45) Date of Patent: Dec. 23, 2014

(54) ACCESS AND CONNECTION FOR A BURIED PIPELINE

(75) Inventor: Jon Paul Smith, Aztec, NM (US)

(73) Assignee: Longshot Integrity Services, LLC, Aztec, NM (US)

(*) Notice: Subject to any disclaimer, the term of this patent is extended or adjusted under 35 U.S.C. 154(b) by 239 days.

(21) Appl. No.: 12/953,041

(22) Filed: Nov. 23, 2010

Related U.S. Application Data

(60) Provisional application No. 61/281,843, filed on Nov. 23, 2009.

(51) Int. Cl.
*F16L 55/18* (2006.01)

(52) U.S. Cl.
CPC ........................ *F16L 55/18* (2013.01)
USPC ............... 405/184.1; 138/97; 138/98

(58) Field of Classification Search
USPC ............ 405/184.1; 138/97–99
See application file for complete search history.

(56) References Cited

U.S. PATENT DOCUMENTS

| | | | |
|---|---|---|---|
| 3,037,925 A | 6/1962 | Boncher et al. | |
| 3,461,540 A | 8/1969 | Rieppel et al. | |
| 3,869,361 A | 3/1975 | Jenkins | |
| 4,244,523 A * | 1/1981 | Looper | 239/227 |
| 4,548,069 A * | 10/1985 | Nousak | 73/49.5 |
| 4,647,073 A * | 3/1987 | Kosaka | 285/23 |
| 4,680,848 A * | 7/1987 | Goldner | 29/213.1 |
| 5,013,880 A | 5/1991 | Puettmann | |
| 5,020,832 A * | 6/1991 | Coblentz | 285/197 |
| 5,624,206 A * | 4/1997 | Cohen et al. | 405/157 |
| 5,638,590 A * | 6/1997 | Silano | 29/254 |
| 5,659,935 A * | 8/1997 | Lo-Pinto et al. | 29/33 T |
| 6,142,165 A * | 11/2000 | Wartel et al. | 137/15.13 |
| 6,273,512 B1 * | 8/2001 | Rajewski | 299/17 |
| 6,669,406 B2 * | 12/2003 | Hutton et al. | 405/184.1 |
| 6,705,801 B1 * | 3/2004 | Kiest, Jr. | 405/184.1 |
| 6,776,068 B2 * | 8/2004 | Reuschel et al. | 81/54 |
| 6,929,430 B2 * | 8/2005 | Dever | 408/80 |
| 7,018,137 B2 * | 3/2006 | Hutton et al. | 405/184.1 |
| 7,089,949 B1 * | 8/2006 | Rogerson et al. | 134/167 R |
| 7,252,459 B2 * | 8/2007 | Bideault | 405/184.1 |
| 7,325,559 B2 * | 2/2008 | Darut et al. | 137/15.12 |
| 8,065,938 B1 * | 11/2011 | Kravitch | 81/177.2 |
| 2002/0150433 A1 * | 10/2002 | Dever | 408/1 R |
| 2004/0003991 A1 * | 1/2004 | Costley, Jr. | 204/196.01 |
| 2004/0037648 A1 * | 2/2004 | Kiest, Jr. | 405/154.1 |
| 2005/0124981 A1 * | 6/2005 | Desarzens et al. | 606/1 |
| 2006/0002765 A1 * | 1/2006 | Hutton et al. | 405/184.1 |
| 2006/0185747 A1 * | 8/2006 | Kiest, Jr. | 138/98 |
| 2007/0227780 A1 * | 10/2007 | MacPherson et al. | 175/320 |
| 2008/0272592 A1 * | 11/2008 | Shaw | 285/288.1 |

FOREIGN PATENT DOCUMENTS

JP 2310385 12/1990

* cited by examiner

*Primary Examiner* — Doug Hutton, Jr.
*Assistant Examiner* — Patrick Lambe
(74) *Attorney, Agent, or Firm* — Deborah A. Peacock; Justin R. Jackson; Peacock Myers, P.C.

(57) ABSTRACT

Access and connection for a buried pipeline, wherein a hole is dug to a buried pipeline, a riser pipe is disposed within the hole, and one or more powered tools are lowered into the hole and activated such that work is performed on the pipeline without the need for anyone to be lowered into the hole. Because no one needs to be physically present down in the hole at the pipeline, the hole, and thus the surface disturbance can be much smaller than conventional pipeline work methods.

28 Claims, 21 Drawing Sheets

ACCESS AND CONNECTION FOR A BURIED PIPELINE

CROSS-REFERENCE TO RELATED APPLICATIONS

This application claims priority to and the benefit of the filing of U.S. Provisional Patent Application Ser. No. 61/281,843, entitled "Method and Apparatus for Accessing and Providing Connection to a Buried Pipeline", filed on Nov. 23, 2009, and the specification, including but not limited to the drawings, thereof is incorporated herein by reference.

BACKGROUND OF THE INVENTION

1. Field of the Invention (Technical Field)

Embodiments of the present invention relate to methods and apparatuses for accessing a buried pipeline and for providing electrical connection thereto, particularly, while causing only a small amount of ground disturbance.

2. Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Since man first started burying pipelines, a need has always existed to permit access to them for maintenance, testing, and repairs. Numerous manners, methods, and devices have been contrived in an attempt to address this persistent need.

U.S. Patent Publication No. 2008/0272592, to Shaw, discloses a method for attaching a branch outlet to a buried pipeline by excavating a keyhole opening down to the pipe and then attaching the branch outlet by an electrically-activated weld. Shaw, however, fails to disclose any manner for removing a protective coating from the pipeline in order to ensure a proper weld—an exceedingly difficult task since a worker's access to the pipeline is so limited by the keyhole opening. Shaw also fails to disclose how a sacrificial anode could be electrically connected to the pipeline and then properly positioned.

There is thus a present need for a method and apparatus which permits electrical connections to be securely made to buried pipelines while creating a minimum of ground disturbance.

BRIEF SUMMARY OF EMBODIMENTS OF THE PRESENT INVENTION

An embodiment of the present invention relates to a method for performing work on a buried pipeline which includes excavating a hole down to the buried pipeline, disposing a riser pipe in the excavated hole, lowering a powered tool having guide plates into the riser pipe, removing a protective coating from the pipeline at a location within the riser pipe, lowering a thermal weld tool having guide plates into the riser pipe, and making a weld on the pipeline with the thermal weld tool. The method can also include backfilling around the riser pipe. The hole can be excavated with a hydrovac system. Optionally, the excavated hole can have a diameter of less than about 24 inches, less than about 16 inches, less than about 12 inches, and/or less than about 8 inches.

In one embodiment, disposing a riser pipe can include disposing a riser pipe having a bottom portion formed to conform to an outside diameter of a top portion of the pipeline. The method can also include lowering a pipeline integrity sensing tool having guide plates into the riser pipe. Making a weld on the pipeline can include welding an electrical wire to the pipeline. Optionally, the electrical wire can be part of a cathodic protection system. In one embodiment, during performance of the method the user remains above ground and/or the method is capable of being performed without the need for anyone to lowered into the excavated hole. Optionally, the method can be performed without the need for a person to physically reach down in to the excavated hole.

An embodiment of the present invention also relates to a method for performing work on a buried pipeline which includes excavating a hole down to the buried pipeline with a hydrovac unit, disposing a riser pipe in the excavated hole, lowering a protective coating removal tool having guide plates into the riser pipe, removing a protective coating from the pipeline with the tool, lowering a thermal weld tool having guide plates into the riser pipe, and welding an electrical wire to the pipeline at a location where the protective coating has been removed by the tool. In one embodiment, the method can be performed without the need for any person to be lowered into the excavated hole. In the method, lowering a protective coating removal tool having guide plates into the riser pipe can include lowering a rotational multi-use tool having guide plates; lowering a needle scaling tool having guide plates; and/or lowering a protective coating removal tool having guide plates into the riser pipe comprises lowering a sandblasting nozzle having guide plates.

An embodiment of the present invention also relates to a method for performing work on a buried pipeline which includes excavating a hole having a diameter of less than about 16 inches down to the buried pipeline; lowering a powered tool down to the pipeline; and performing work on the pipeline without the need for any person to be lowered into the excavated hole. In the method, the powered tool can remove a coating from the buried pipeline. Optionally, the powered tool can include a sandblasting nozzle which removes a coating from the buried pipeline.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

An embodiment of the present invention provides a user access to a buried pipeline to make an electrical connection thereto, most preferably without causing a substantial amount of surface damage such as that caused by the use of a backhoe for digging a hole large enough for workers to be physically present down at the pipeline.

As occasionally used throughout this application, the terms upper, lower, top, and/or bottom are used only to assist the reader in understanding the invention when the invention is being used in its normal operating mode with respect to a pipeline that is buried underground. Accordingly these terms are not meant to limit any other potential use of the present invention. The term "guide plates" as used throughout this application is intended to include any structure, mechanism, device, and/or system by which a tool can be held at a predetermined position within a riser pipe. Accordingly, the "guide plates" need not actually have a plate-like structure. The term "riser pipe" as used throughout this application is intended to include any elongated structure and/or assembly capable of being lowered into an excavated hole and which can assist in retaining earth from the interior of the excavation.

In one embodiment, access to a buried pipeline is preferably made via hydrovac excavation, such that a hole which is about six inches to about 24" in diameter (depending upon the diameter of the buried pipeline and/or the desired work to be performed upon the pipeline) is excavated. The hole preferably extends from a ground surface down to the buried pipeline. A riser pipe having an outside diameter which is less than the diameter of the excavated hole is preferably placed in the hole and extends from the pipe to a distance above ground level. Most preferably, a concave saddle shape is cut into the bottom of the riser pipe such that the pipe sits around and thus substantially conforms with the buried pipeline. The hole outside of the riser pipe is then preferably backfilled such that the riser pipe is held in place against the buried pipeline. The tools according to the present invention are preferably lowered into the riser pipe and thus made to work on the buried pipeline.

Figure 1:
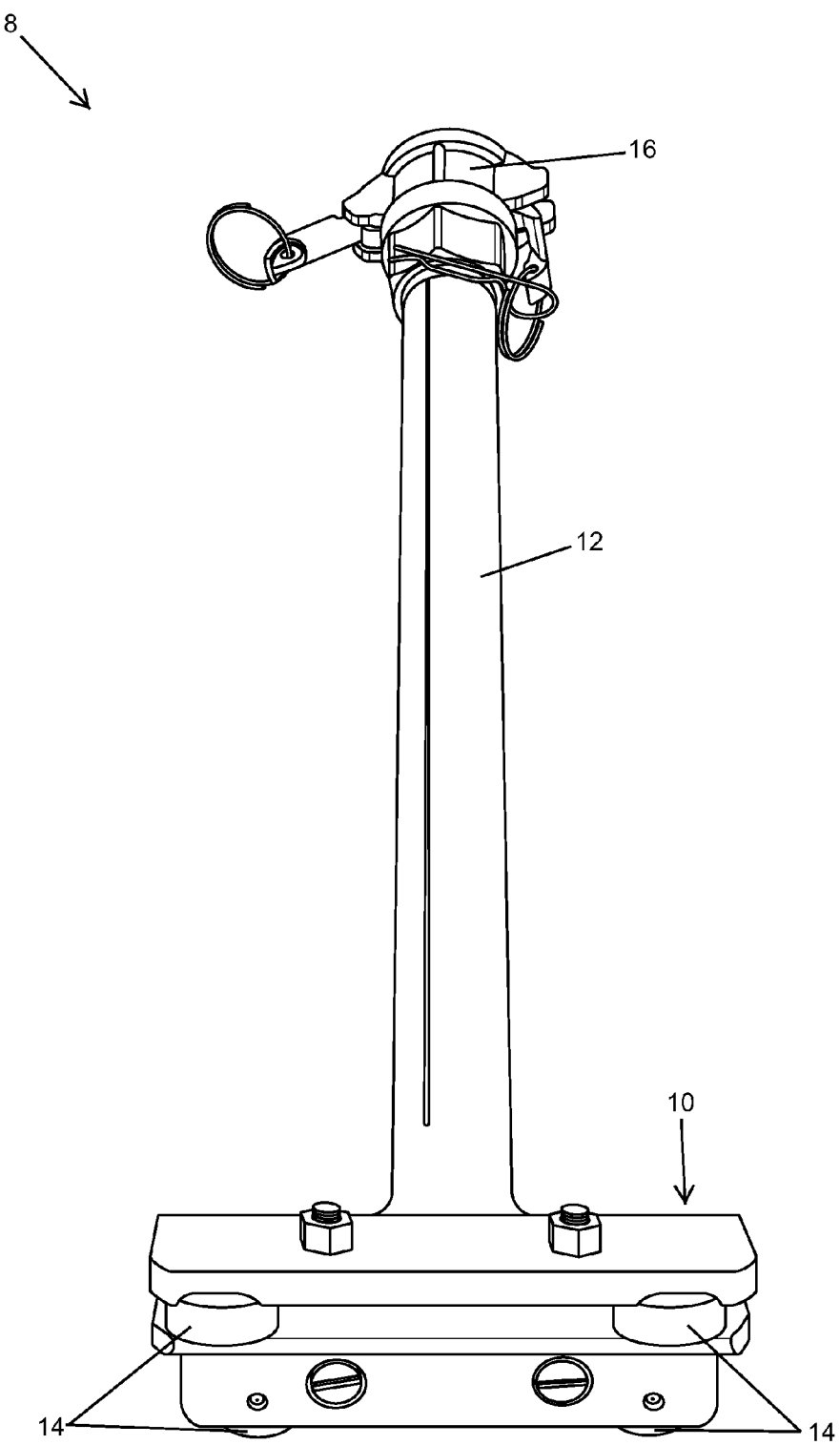
FIG. 1 is a drawing which illustrates an embodiment of a pipeline self-centering tool.
Figure 2:
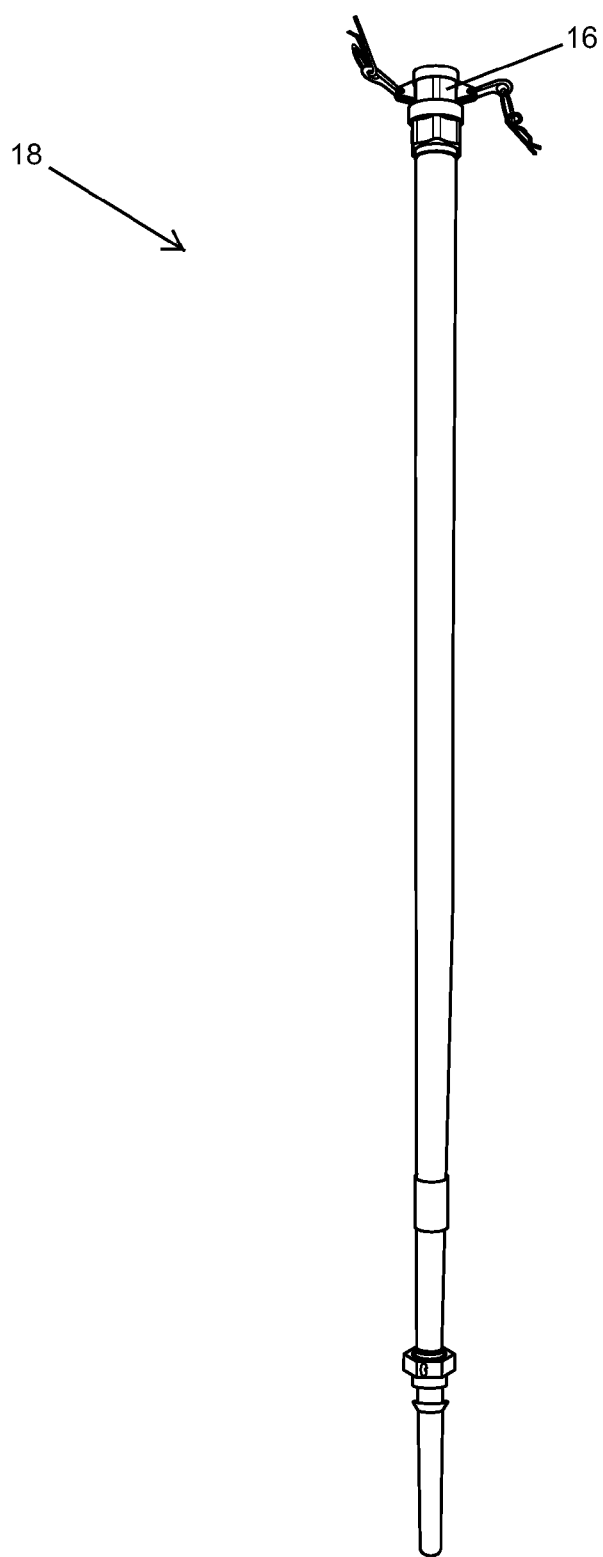
FIG. 2 is a drawing which illustrates an extension according to an embodiment of the present invention.

An embodiment of the present invention is illustrated in FIGS. 1 and 2. As illustrated therein, self-centering tool 8 preferably comprises angled portion 10 attached to an end of elongated shaft 12. Shaft 12 can be but need not be hollow and can also optionally be made from a solid piece of material, such as a rod. One or more magnets 14 are preferably attached to angled portion 10. In use, after installing a riser pipe down to a buried pipeline, a user can insert self-centering tool 8 into the riser pipe until angled portion 10 makes contact with an upper portion of the pipeline. If the pipeline is made from a ferrous material, magnets 14 help pull the angled portion down onto the pipeline. Because of its v-shape, angled portion 10 has a tendency cause tool 8 to self-center about a pipeline. When angled portion 10 is disposed about the upper portion of a buried pipeline, a user can determine if the installed riser pipe is squarely above the pipeline simply by observing whether shaft 12 is centrally-orientated within the riser pipe. If, for example, the buried pipeline is diving deeper into the ground at the location of a vertically-oriented riser pipe, then the riser pipe will not be perpendicularly-orientated over the buried pipeline and thus tools which are disposed in and axially oriented with the riser pipe will not be perpendicular with the buried pipeline. Tool 8, however, can alert the user to this situation prior to performing any work on the buried pipeline. As illustrated in FIGS. 1 and 2, shaft 12 can comprise attachment mechanism 16 which permits additional extensions 18 to be connected thereto such that tool 8 can be used for pipelines which are buried at different depths.

Figure 3:
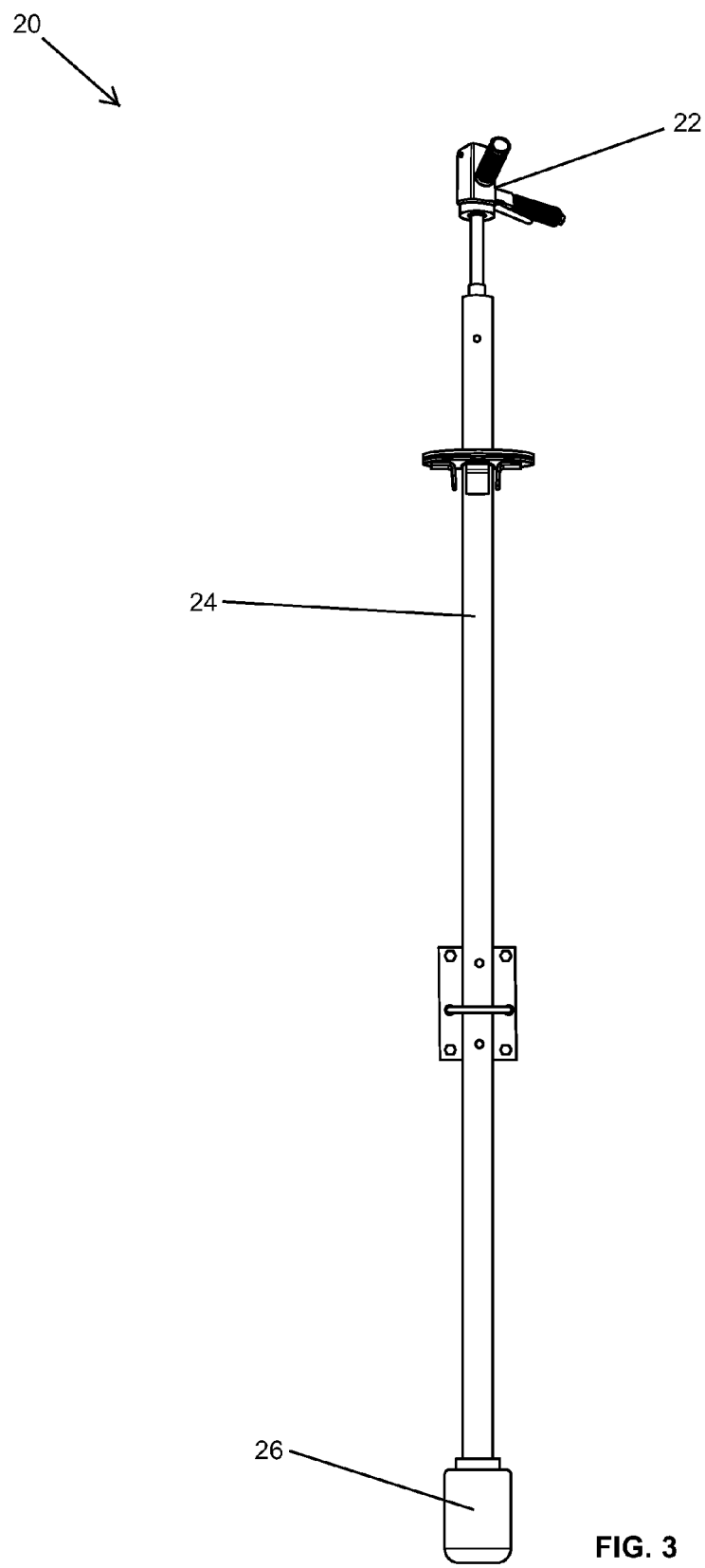
FIG. 3 is a drawing which illustrates a top-powered rotary multi-use tool of the present invention.
Figure 4:
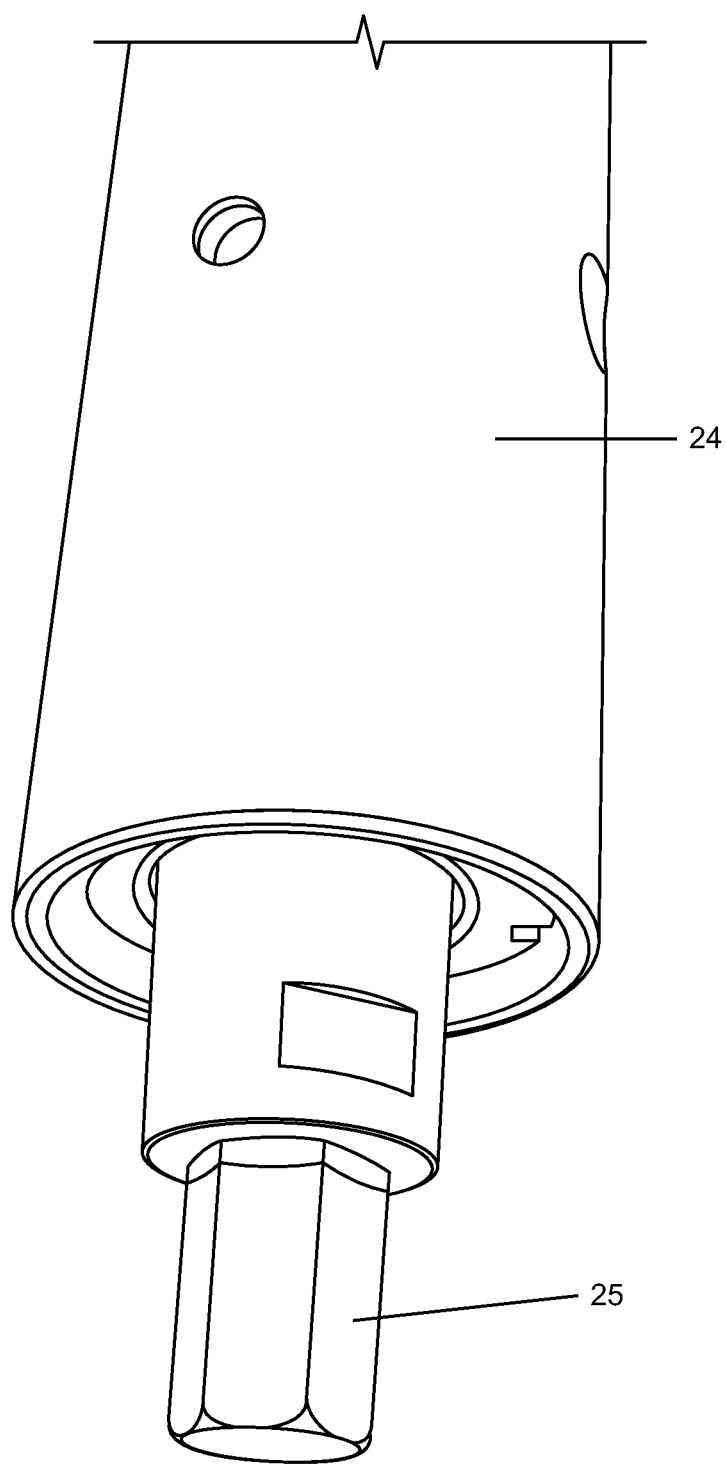
FIG. 4 is a drawing which illustrates a rotary shaft and shaft enclosure of an embodiment of the present invention.
Figure 5:
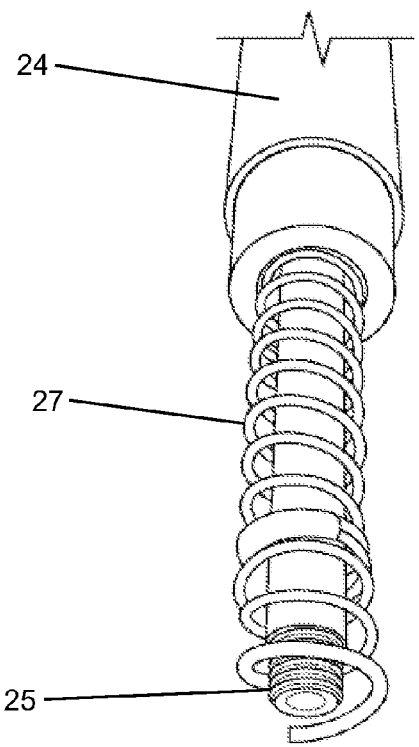
FIG. 5 is a drawing which illustrates a spring of the rotary shaft according to an embodiment of the present invention.
Figure 6:
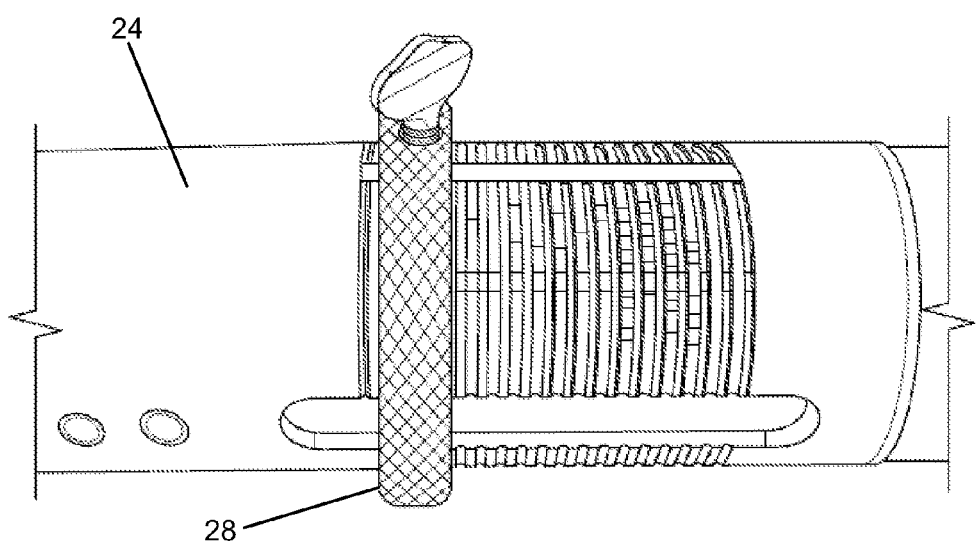
FIG. 6 is a drawing which illustrates an embodiment of an adjustable stop mechanism for the rotary shaft of FIG. 5.
Figure 9A:
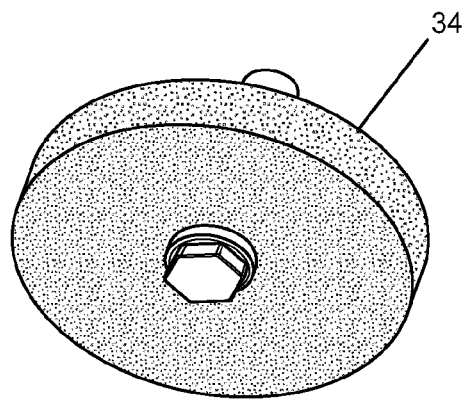
FIGS. 9A-C are drawings which illustrate various rotary work bits according to embodiments of the present invention.
Figure 9B:
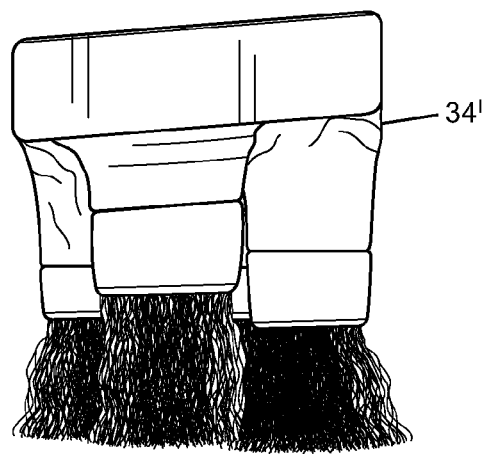
Figure 9C:
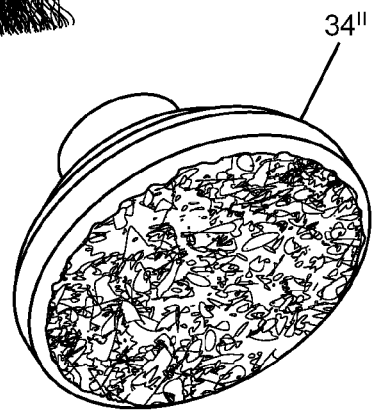

Referring to FIG. 3, an embodiment of the present invention relates to top-powered rotational multi-use tool 20, which can be used for removing a protective coating from a portion of the buried pipeline. Top-powered rotational multi-use tool 20 preferably includes rotational power unit 22 disposed at a first end of rotational shaft enclosure 24, which drives a rotational work bit disposed within housing 26. In this embodiment, shaft enclosure 24 preferably houses rotational shaft 25 (see FIG. 4). The rotational work bit (see FIGS. 9A-C) is preferably retained with housing 26 under tension from spring 27 (see FIG. 5), but can be made to extend to extend to the opening of housing 26 by a user pressing down on rotational power unit 22, thereby compressing spring 27 and causing rotational shaft 25, with a work bit attached thereto, to extend to the opening of housing 26. The amount of travel of shaft 25 and the work bit can be limited and/or adjusted by adjustment of stop 28 (see FIG. 6) on shaft enclosure 24.

Figure 7:
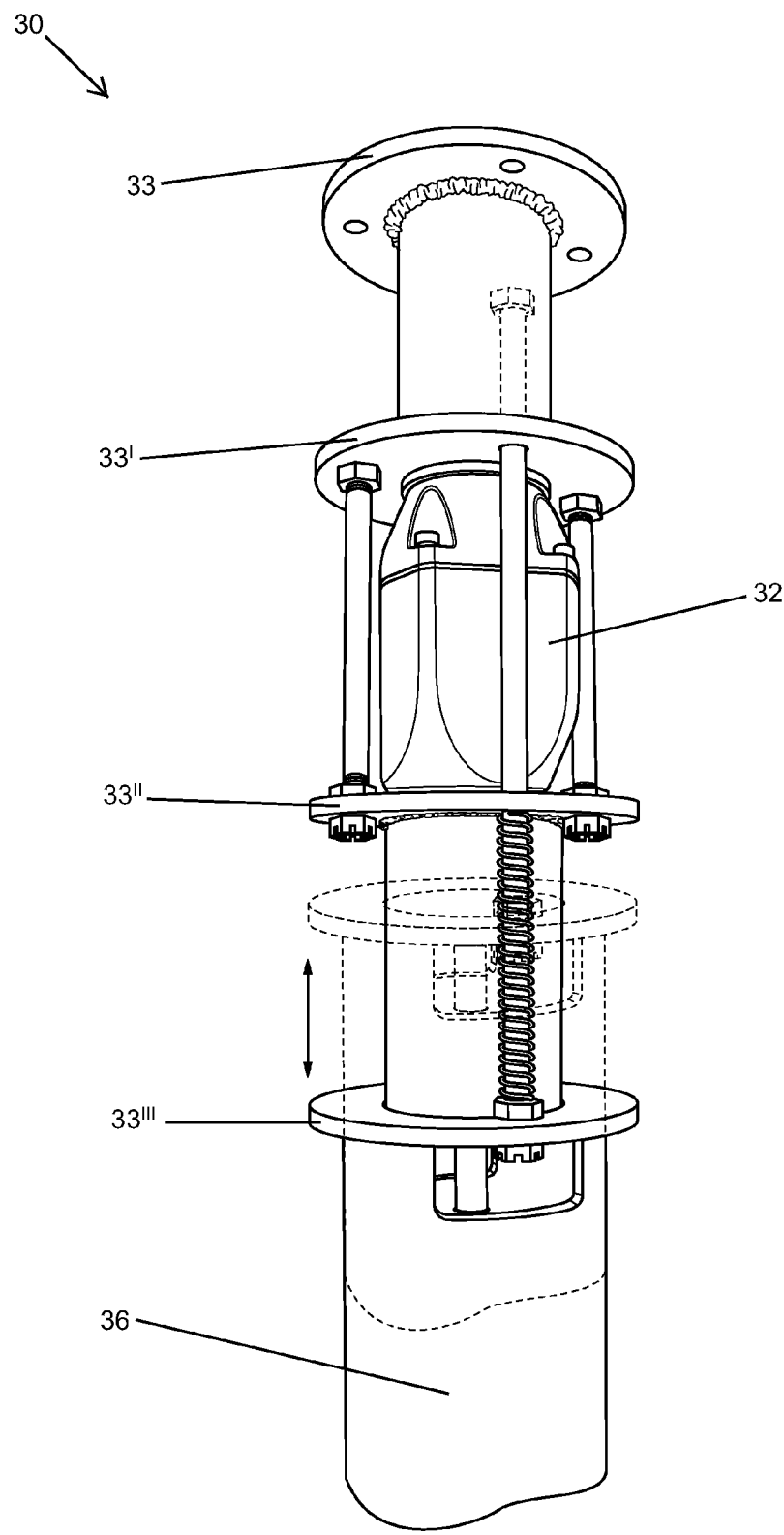
FIGS. 7 and 8 are drawings which illustrate a bottom-powered rotary multi-use tool according to an embodiment of the present invention.
Figure 8:
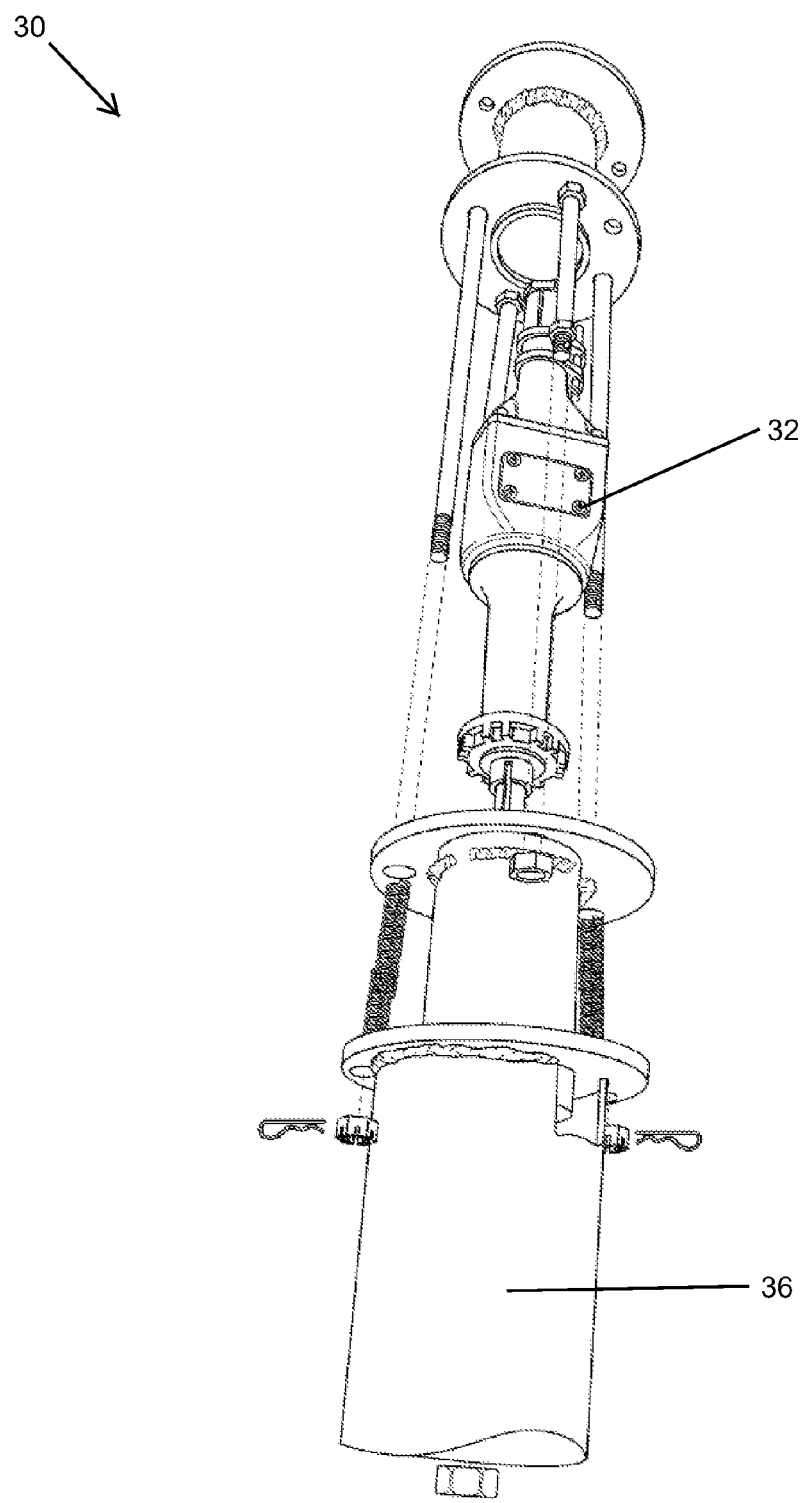

As illustrated in FIGS. 7 and 8, while top-powered rotational multi-use tool 20 can provide desirable results, bottom-drive rotational multi-use tool 30 is more preferably provided. Because tool 30 provides power unit 32 close to rotational work bits 34, 34', and/or 34", (see FIG. 9), the frictional and rotational losses caused by rotational shaft 25 of the top-powered rotational multi-use tool are avoided, thereby permitting power unit 32 to provide greater power to work bits 34, 34', and/or 34". As best illustrated in FIG. 7, tool 30 preferably includes guide plates 33, 33', 33", and 33''', which have outside dimensions slightly smaller than the inside diameter of a riser pipe. Accordingly, when tool 30 is lowered into riser pipe, tool is thus caused to slide straight down the riser pipe. In addition, tool 30 also preferably includes work bit housing 36 which is slidable and spring-loaded. In operation, tool 30 is preferably lowered into a riser pipe; a terminal end of housing 36 is preferably pressed against a top portion of a buried pipeline; a user activates power unit 32, and applies a downward pressure to a top portion of tool 30, thereby causing housing 36 to retract, and thus causing a rotating work bit to be brought to bear on a top surface of the buried pipeline, such that an outer coating thereof can be removed.

Although rotational power units 22 and/or 32 are most preferably powered from a pneumatic supply, various other power supplies can optionally be used and will provide desirable results, including but not limited to hydraulic power, internal combustion engines, electrical motors, hand-powered, and combinations thereof.

Depending upon the type of coating and/or protective layer disposed on a pipeline, any of various types of work bits 34, 34', and/or 34" can be used, including but not limited to a grinding stone, any of the numerous types of wire brushes, and/or any of the numerous types of sanding and/or buffing pads. Because different types of work bits can have different lengths, multiple sizes of housing 36, 36', and 36" (see FIG. 10) can be provided.

Figure 10:
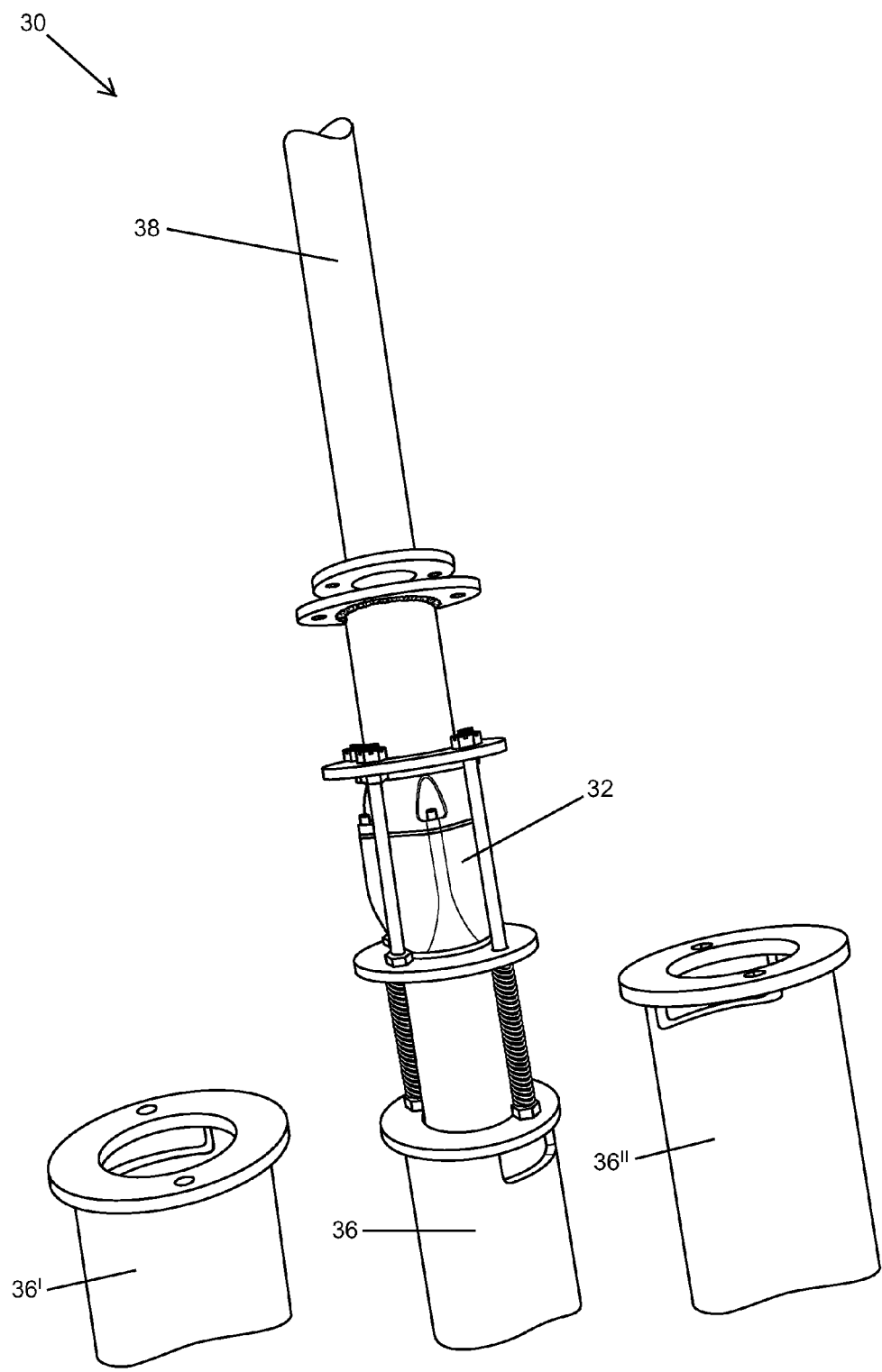
FIG. 10 is a drawing which illustrates various sizes of rotary work bit housings disposed side-by-side.

As best illustrated in FIG. 10, one or more extension members 38 can be connected to bottom-drive rotational multi-use tool 30. While those skilled in the art will recognize numerous manners for activating power unit 32 upon studying this application, in one embodiment wherein power unit 32 comprises a pneumatic motor, an air line preferably extends up thorough a center portion of, or beside, extension members 38 to a location above the riser pipe such that a user can activate an easily-accessible air valve. Optionally, one or more flexible joints can be provided which permits a work bit, attached to tool 30, and/or 20, to accommodate a non-normal angle relationship between the riser pipe and the buried pipeline. For example, if a particular section of a buried pipeline is orientated such that there is a relative rise or fall of the pipeline in relation to a ground surface, then riser pipe can still be orientated in a normal angle with respect to the ground surface and the tool can still be orientated to properly contact the surface of the pipeline. Optionally, the tool can be housed within an aligning jig, such as a length of angle iron, or a curved-member having inside dimensions substantially conforming to the outside diameter of the pipeline.

Figure 11:
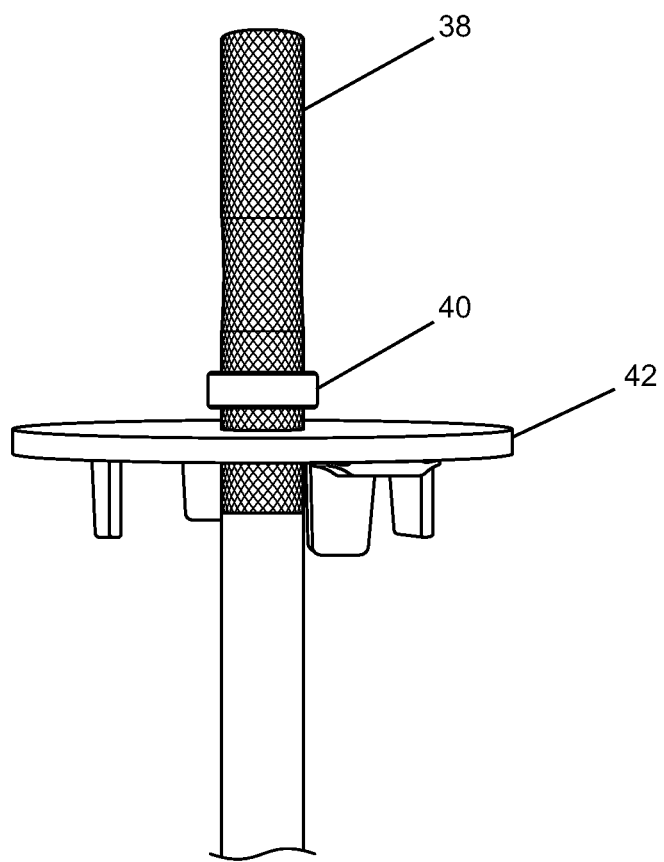
FIG. 11 is a drawing which illustrates a riser pipe top plate with an extension handle disposed therethrough, the extension handle having an adjustable stop disposed thereon.

FIG. 11 illustrates adjustable stop mechanism 40 which can be used in conjunction with bottom-drive rotational multi-use tool 30. In this embodiment, top plate 42 is preferably positionable over a buried riser pipe such that it securely rests on the top of the riser pipe. Adjustable stop 40 is preferably positioned around extension member 38 or an elongated top portion of tool 30, which is passed through a central opening in top plate 42. By lowering tool 30 into the riser pipe until housing 36 touches a top of the pipeline, a user can then press tool 30 down until work bit 34 touches a top surface of the pipe coating. If the user desires to remove 1/16" of the top coating and no more, a user simply adjusts stop 40 to be secured to extension member 38 a distance of 1/16" above top plate 42 while housing 36 is depressed and while work bit 34 is touching the top surface of the pipeline coating. Then, the user can activate tool 30 and press it down against the pipeline until stop 40 contacts top plate 42. Accordingly, work bit 34 will have removed 1/16" of the pipeline's top coating.

Although a most preferred embodiment of the present invention provides a rotary power mechanism which powers a rotating work bit, in some embodiments a vibrating tool and/or drive mechanism can optionally be provided. For example, in an alternative embodiment, a vibratory sander can optionally be used to remove a protective layer from a portion of a buried pipeline. In another alternative embodiment, the drive mechanism can instead, or in addition to, comprise a pressurized fluid delivery mechanism, most preferably with an abrasive entrained therein. For example, a pneumatic sandblasting nozzle can optionally be used as a tool for removing the protective layer from the pipe, or a pressure washing nozzle, with or without sand entrained in the water.

Figure 12:
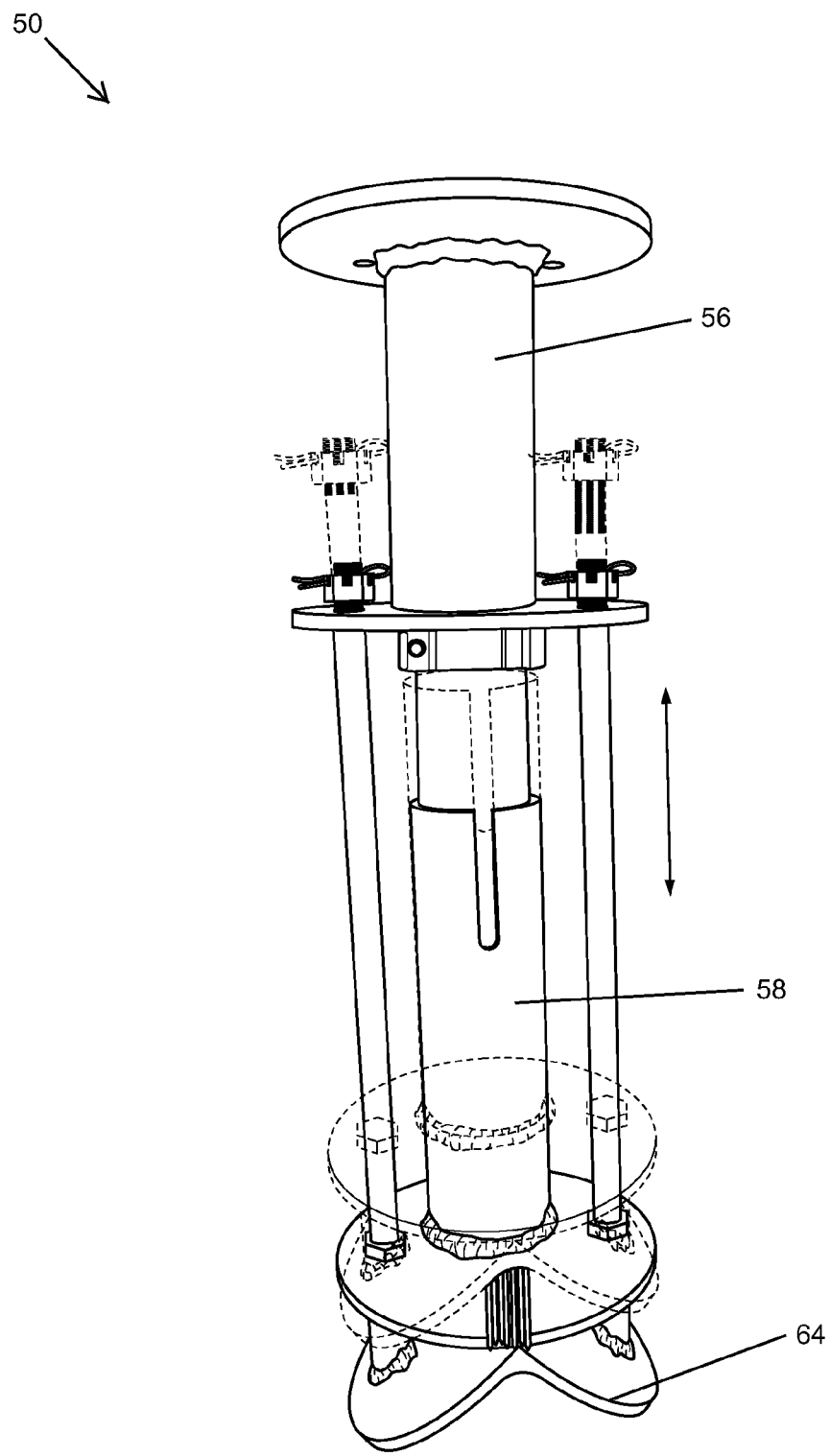
FIGS. 12 and 13 are drawings which illustrate a needle scaling tool according to an embodiment of the present invention.
Figure 13:
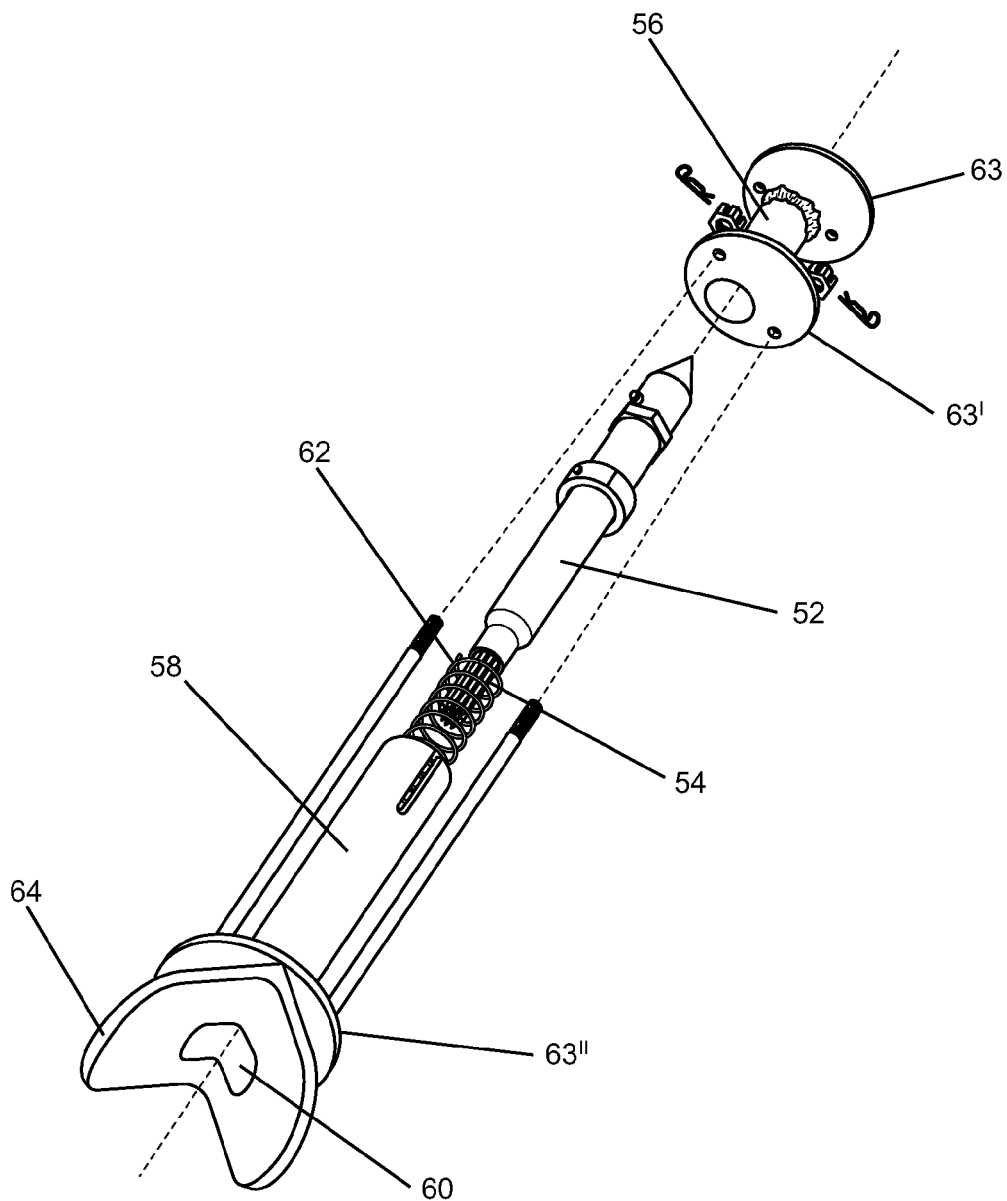

Referring now to FIGS. 12-13, in one embodiment, pneumatically-powered needle scaling tool 50 is optionally used in place of rotational multi-use tools 20 and/or 30. In this embodiment, tool 50 preferably includes needle scaler 52, having needles 54, disposed between top housing 56 and bottom housing 58. Bottom housing 58 most preferably comprises central opening 60 through which needles 54 pass. Spring 62 is preferably disposed around needles 54 and is preferably compressed between a lower portion of needle scaler 52 and opening 60, which preferably has a diameter sufficiently large enough to allow needles 54 to pass therethrough, but sufficiently small enough to prevent spring 62 from passing therethrough. A plurality of guide plates 63, 63', and 63" are preferably disposed along the length of tool 50. Guide plates 63, 63', and 63" preferably comprise dimensions slightly smaller than the inside dimensions of a riser pipe. Accordingly, when tool 50 is lowered into a riser pipe, guide plates 63, 63', and 63" act to guide tool 50 straight down the riser pipe.

Bottom housing 58 of needle scaling tool 50 preferably comprises shaped end 64 which is preferably v-shaped, or otherwise curved, or comprises some other shape which causes self-alignment with a top portion of a buried pipeline. In use, spring 62 preferably causes needles to be retracted from opening 60 of bottom housing 58. However, when shaped end 64 is brought into contact with a top of a pipeline and a user applies a downward force on tool 50, spring 62 is thus preferably compressed, thereby causing needles 54 to extend out of opening 60 and contact a top coating of the buried pipeline.

Figure 14A:
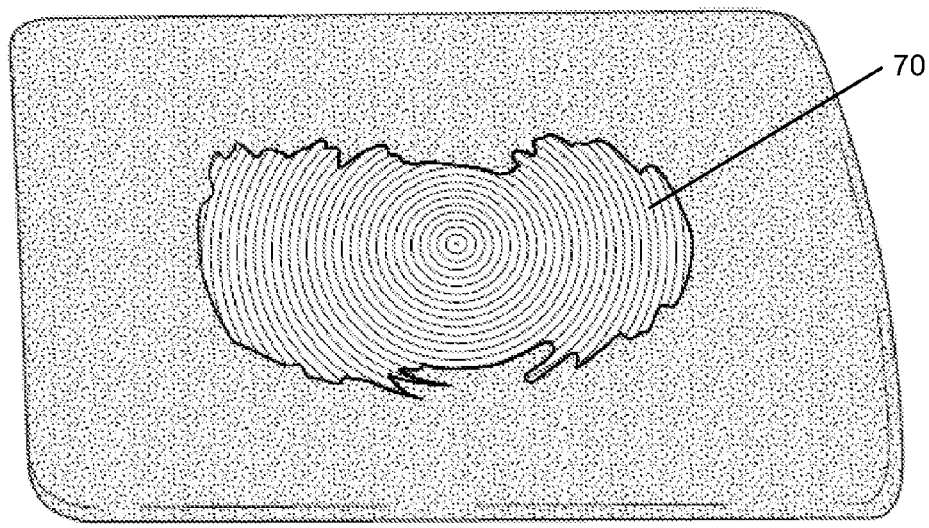
FIGS. 14A and B are drawings which illustrate exemplary patterns created in a coating of a pipeline by rotary work bits and needle scaling tools according to an embodiment of the present invention.

FIG. 14A illustrates pattern 70, which is typically created from rotational multi-use tools 20 and 30. As can be clearly seen, the outer circumference of work bit 34 removes a wider area of the coating of the buried pipeline than does the central portion. Accordingly, a single use of rotational multi-use tools 20 and/or 30 causes two larger regions of pipeline coating to be removed from each side of the central axis of the rotary tool. Because of this pattern created through the coating, a user can then apply two connections to the buried pipeline, one on each side of the central axis. While any of the numerous types of connections may be needed for any given pipeline, one such example includes electrical connection to the pipeline, which may be useful for cathodic protection purposes. Even if only a single connection is needed for a pipeline, two of them can easily be provided in accordance with the teachings of the present invention, thus affording the user with a back-up connection should one of the connections fail.

Figure 14B:
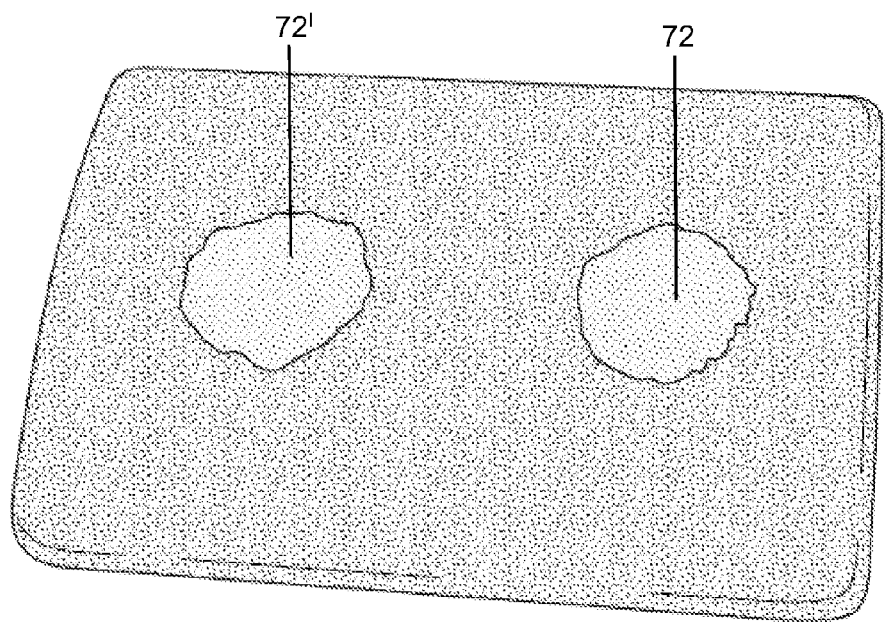

FIG. 14B illustrates patterns 72 and 72' which are created from needle scaling tool 50. Because a backup connection to a pipeline is often advantageous, needle scaling tool 50 is preferably offset with respect to a central axis of the riser pipe, such that pattern 72 can be created from tool 50, and then tool

50 can be rotated ½ revolution about its primary axis and pattern 72' then can be created.

Figure 15A:
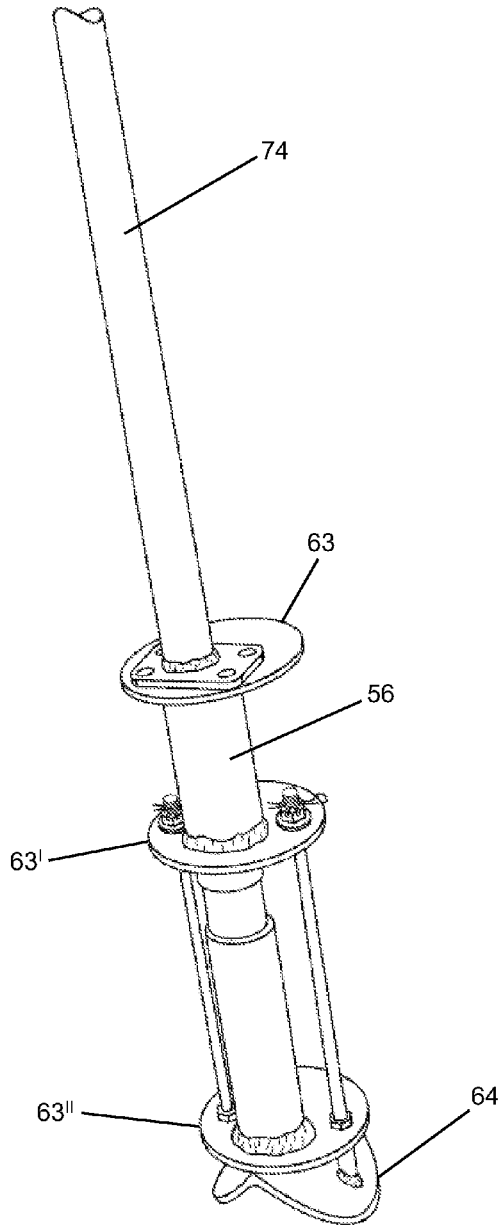
FIGS. 15A and B are side-by-side drawings which illustrate a needle scaling tool and a bottom-drive rotary multi-use tool.
Figure 15B:
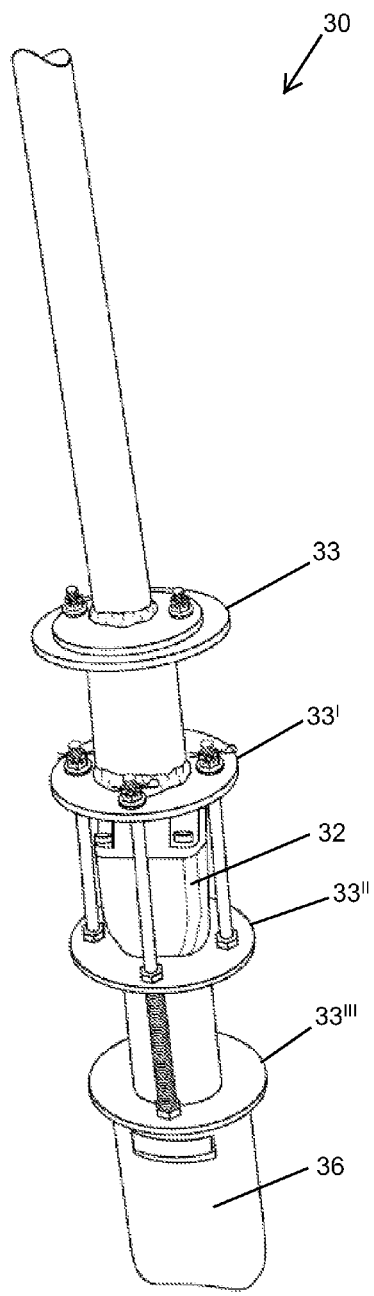

As best illustrated in the side-by-side drawings of FIGS. 15A and B, because rotational multi-use tools 20 and/or 30 create a single wide pattern having two enlarged lobes on each side of its central point of rotation, power unit 32 is preferably centrally positioned with respect to riser pipe guide plates 33-33'''. In contrast, needle scaling tool 50 creates a single pattern. Because of this, in one embodiment, needle scaler 52 is preferably offset from a central axis of the riser pipe by offsetting the needle scaler 52 with respect to a center of riser pipe guide plates 63-63". One or more needle scaling tool extensions 74 can optionally be provided in order to permit a user to engage pipelines buried at various depths. Optionally, tool extensions 74 can be constructed such that they are attachable to needle scaling tool 50 directly above needle scaler 52. Alternatively, tool extensions 74 can be constructed such that they are attachable to needle scaling tool 50 in a center of guide plate 63.

Figures 16A, 16B:
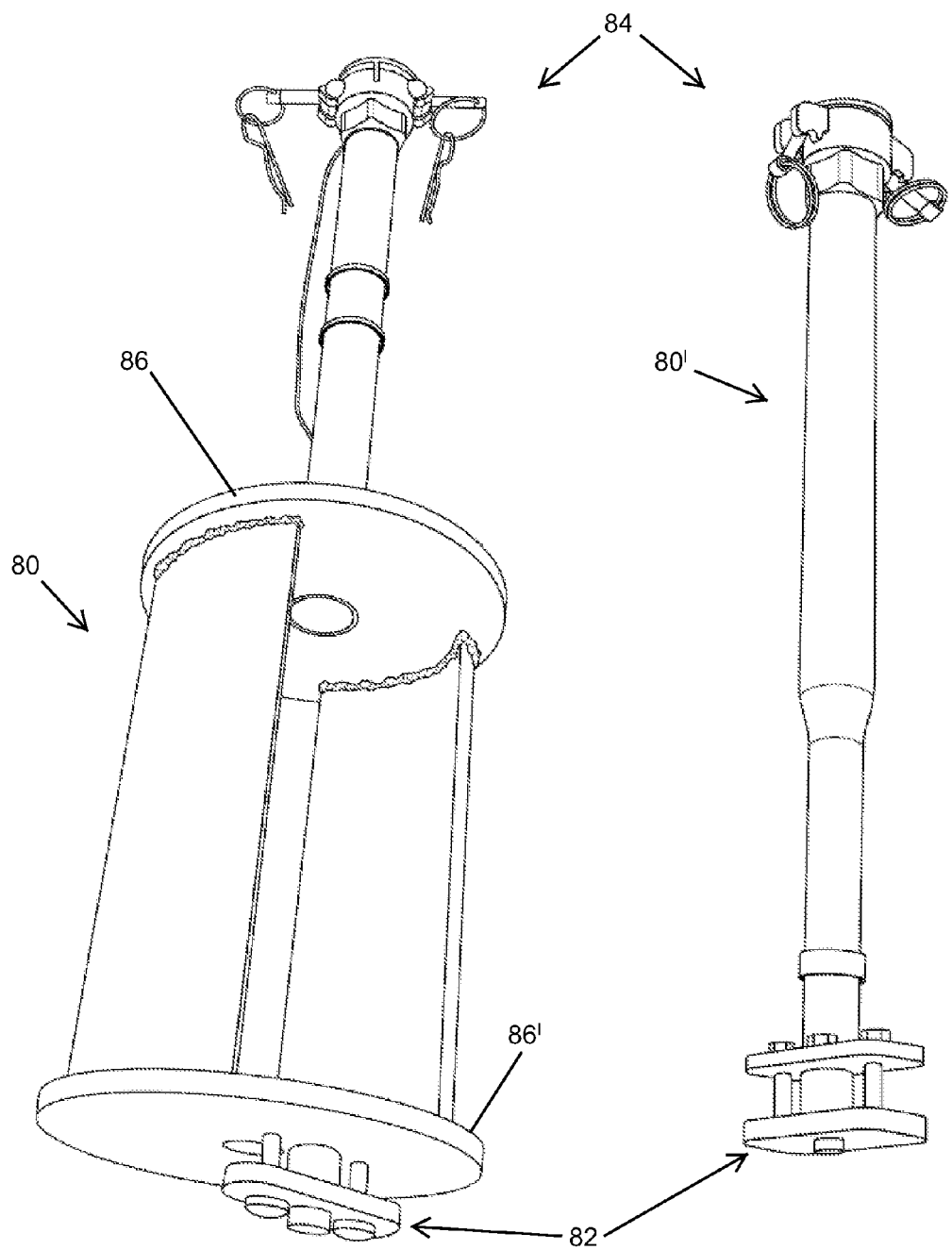
FIGS. 16A and B are side-by-side drawings which illustrate pipeline integrity sensor tools according to an embodiment of the present invention.

After a portion of the protective layer has been removed from the buried pipeline, the integrity and/or thickness of the pipe wall at the work site is preferably determined. In one embodiment, this is preferably achieved with the use of a device which provides a sonogram. FIGS. 16A and B are drawings which illustrate embodiments of sensor placement apparatuses 80 and 80'. Each of apparatuses 80 and 80' preferably include pipe wall thickness sensor 82 and optionally connector 84, which permits extensions 18 (see FIG. 2) to be added in order to accommodate pipes buried at various depths. Sensor placement apparatus 80 preferably includes a plurality of riser tube guide plates 86 and 86' which enables sensor 82 to be off set at a predetermined location such that sensor aligns with a large lobe of pattern 70 (FIG. 14A) and/or patterns 72 and 72'.

Figure 17:
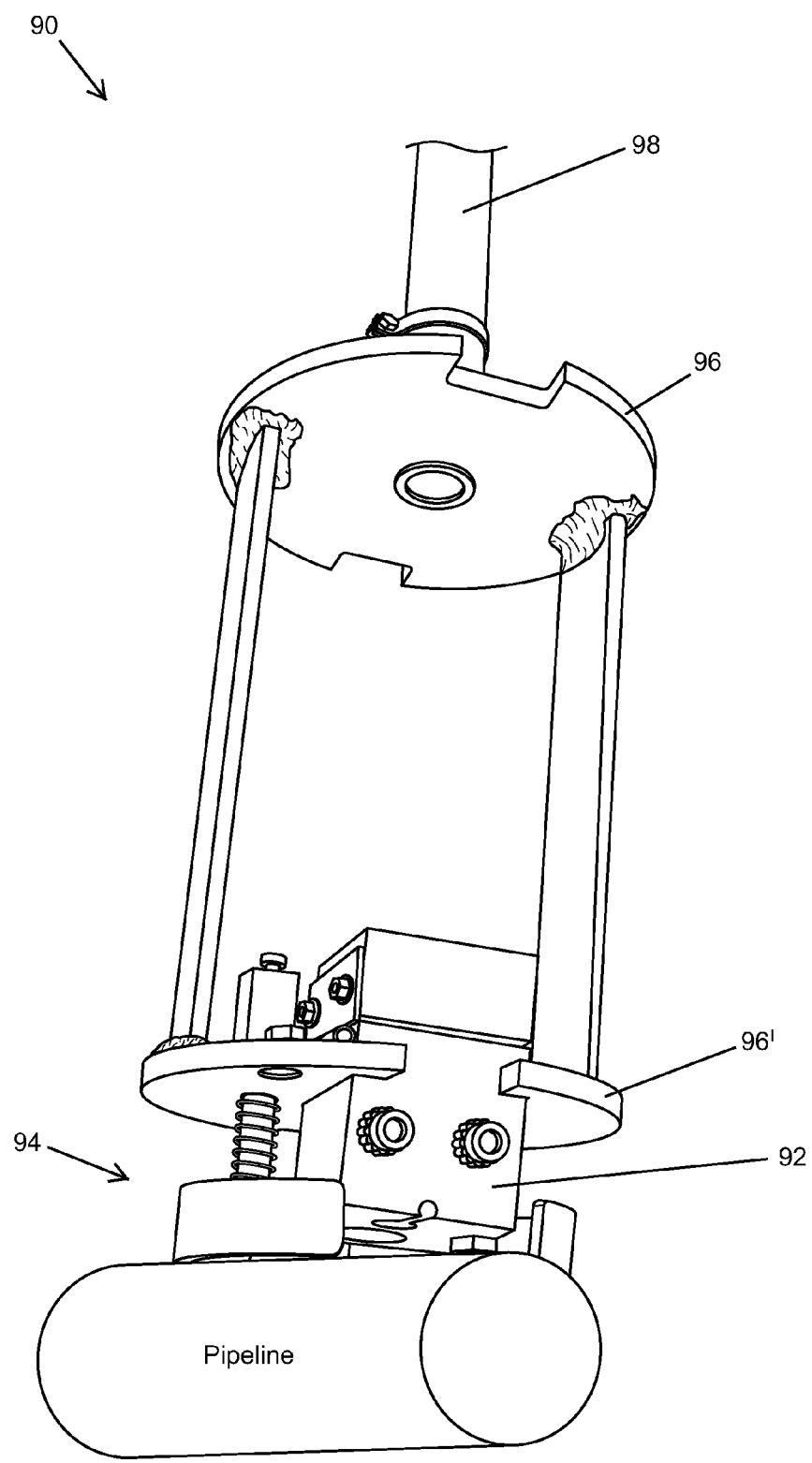
FIG. 17 is drawing which illustrates a thermal welding tool disposed on a pipeline according to an embodiment of the present invention.

As illustrated in FIG. 17, in one embodiment if the pipeline is found to be sufficiently sound, thermal welding mold tool 90, which preferably includes thermal welding unit 92, spring-loaded pipeline-centering guide 94, and a plurality of guide plates 96 and 96', as well as elongated handle and or attachment mechanism 98, is preferably lowered into the riser pipe such that thermal welding mold tool 90 is capable of welding one or more wires to the surface of the pipeline. In one embodiment, thermal welding unit 92 is offset with respect to a center of tool 90 such that the weld created by unit 92 is directly on top of either pattern 72, 72' and/or either lobe of pattern 70 (see FIGS. 14A and B).

Any one or more of the foregoing apparatuses for reaching down into the riser pipe for gaining access to the pipeline can of course comprise one or more couplings and/or extensions such that it can be extended to any desired depth.

Figure 18:
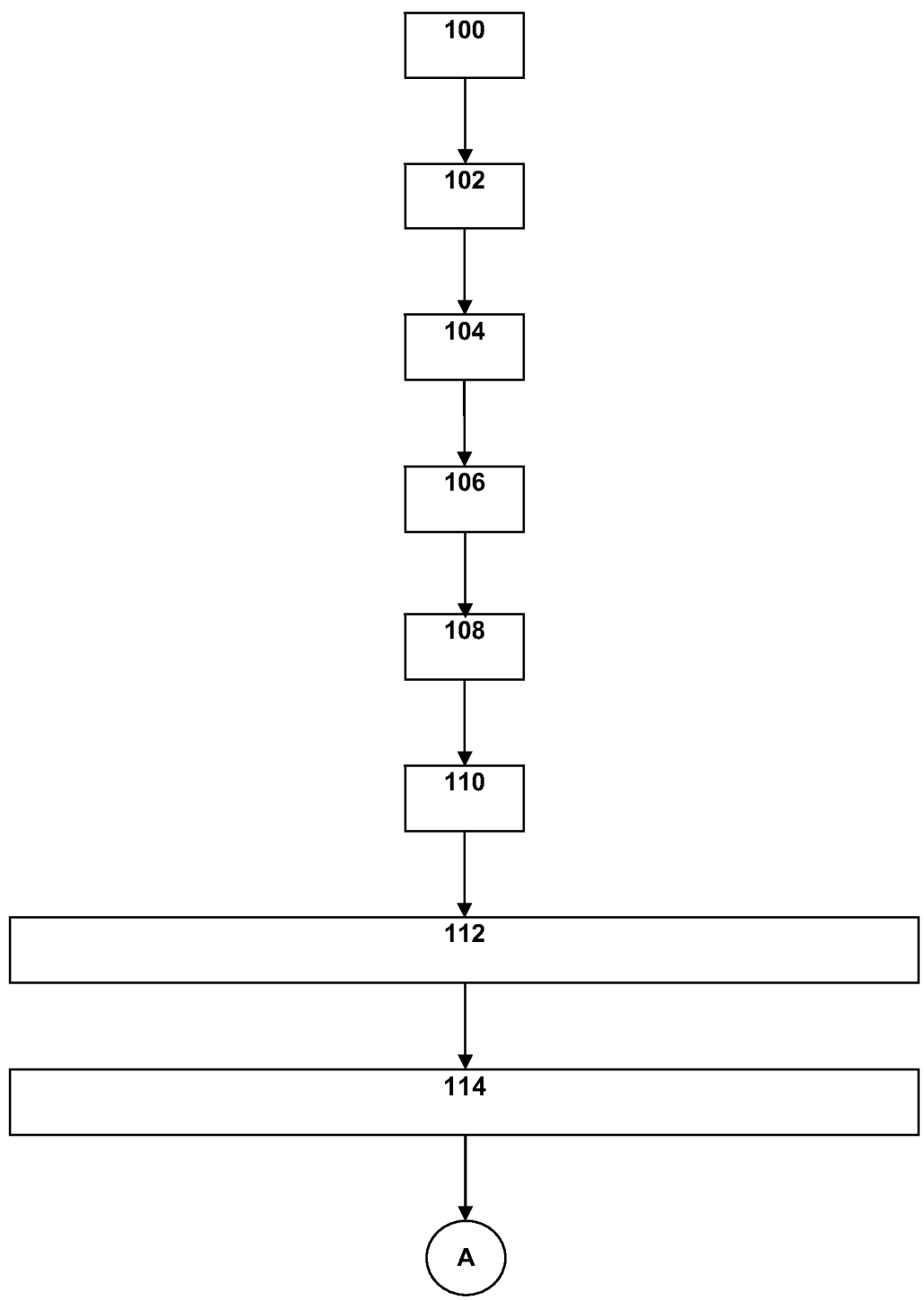
FIG. 18 is a flow chart illustrating a preferred procedure for installation of a sacrificial anode/current bleed according to an embodiment of the present invention.
Figure 18:
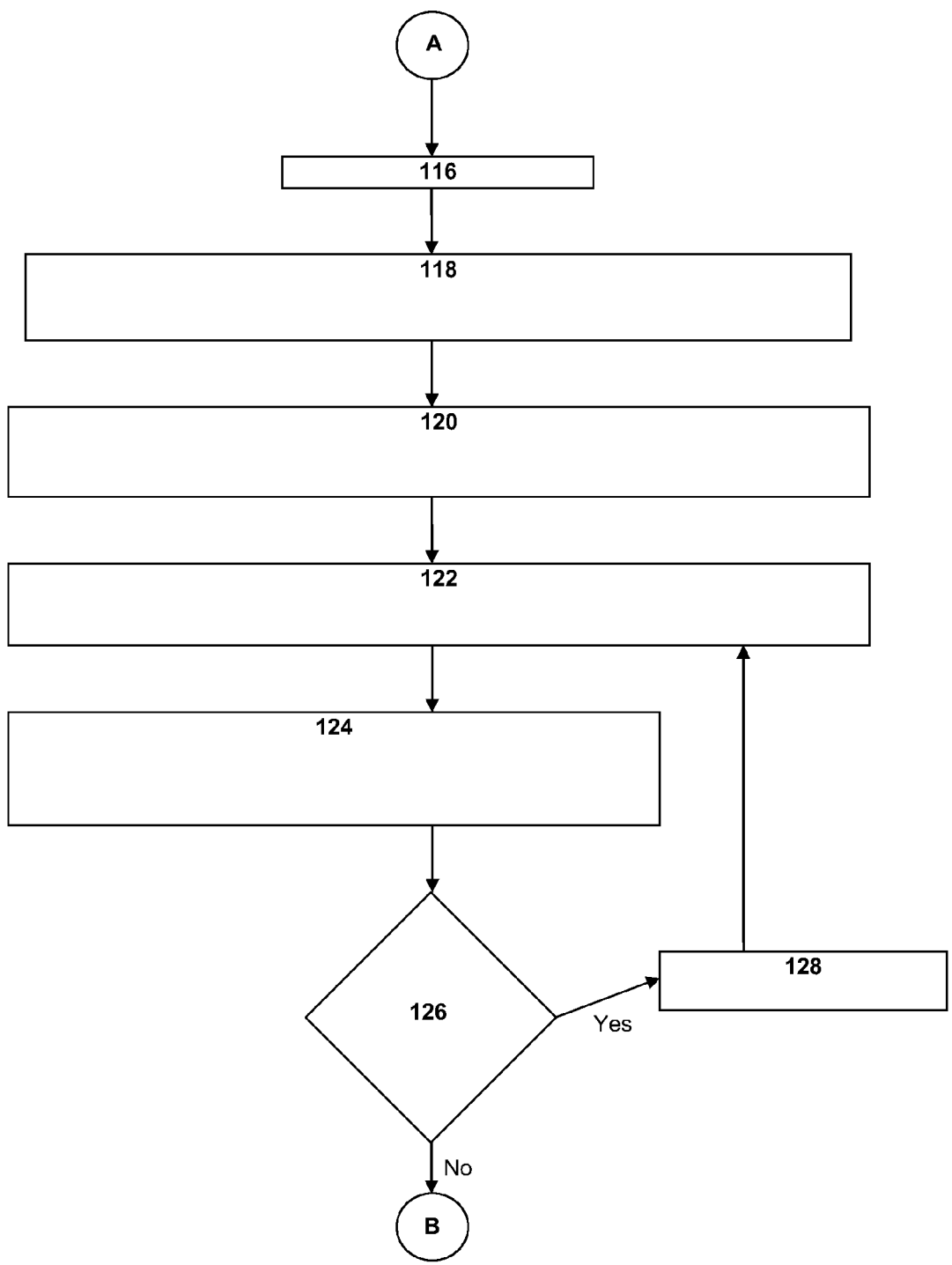
Figure 18:
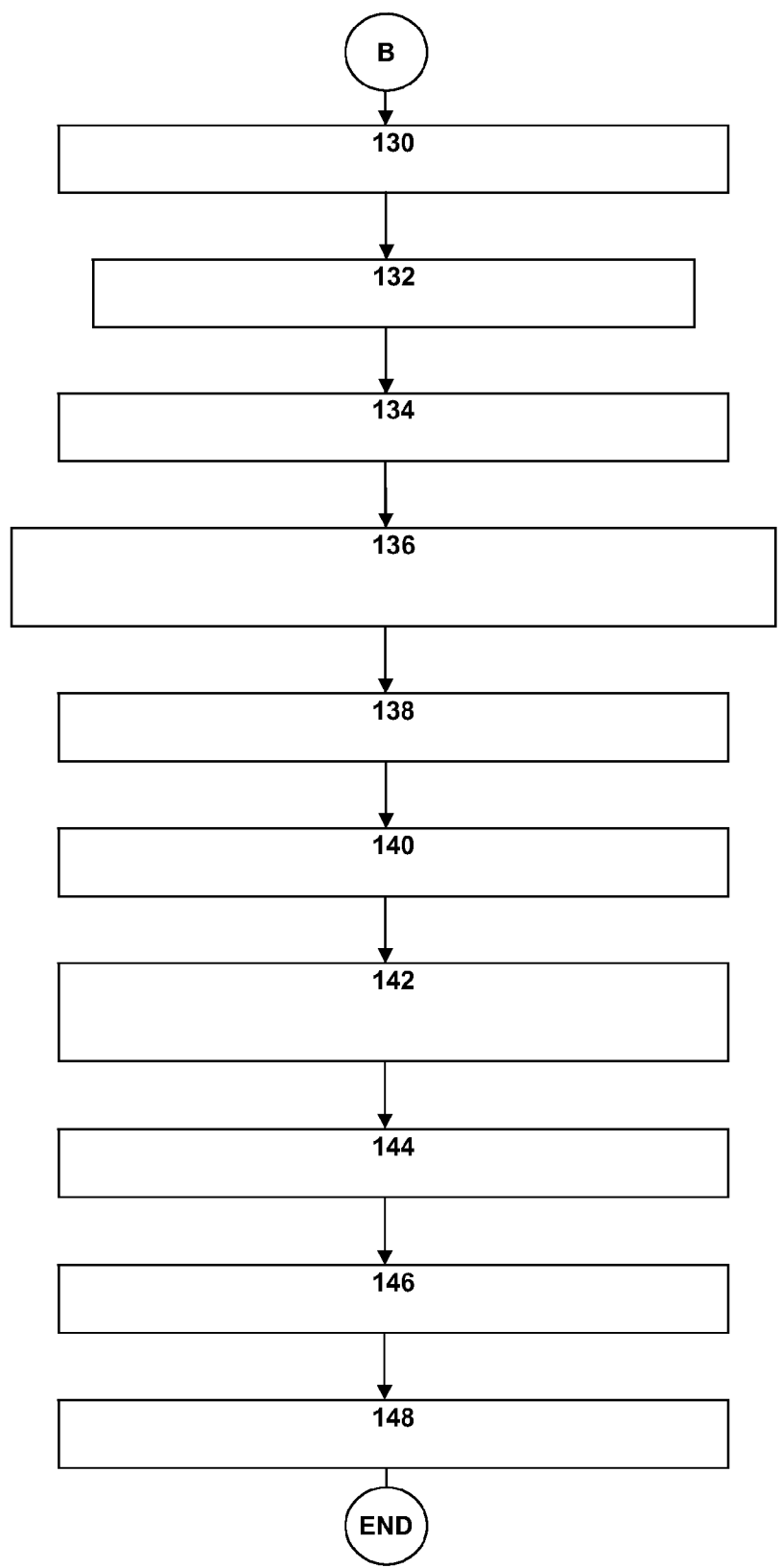
Figure 19:
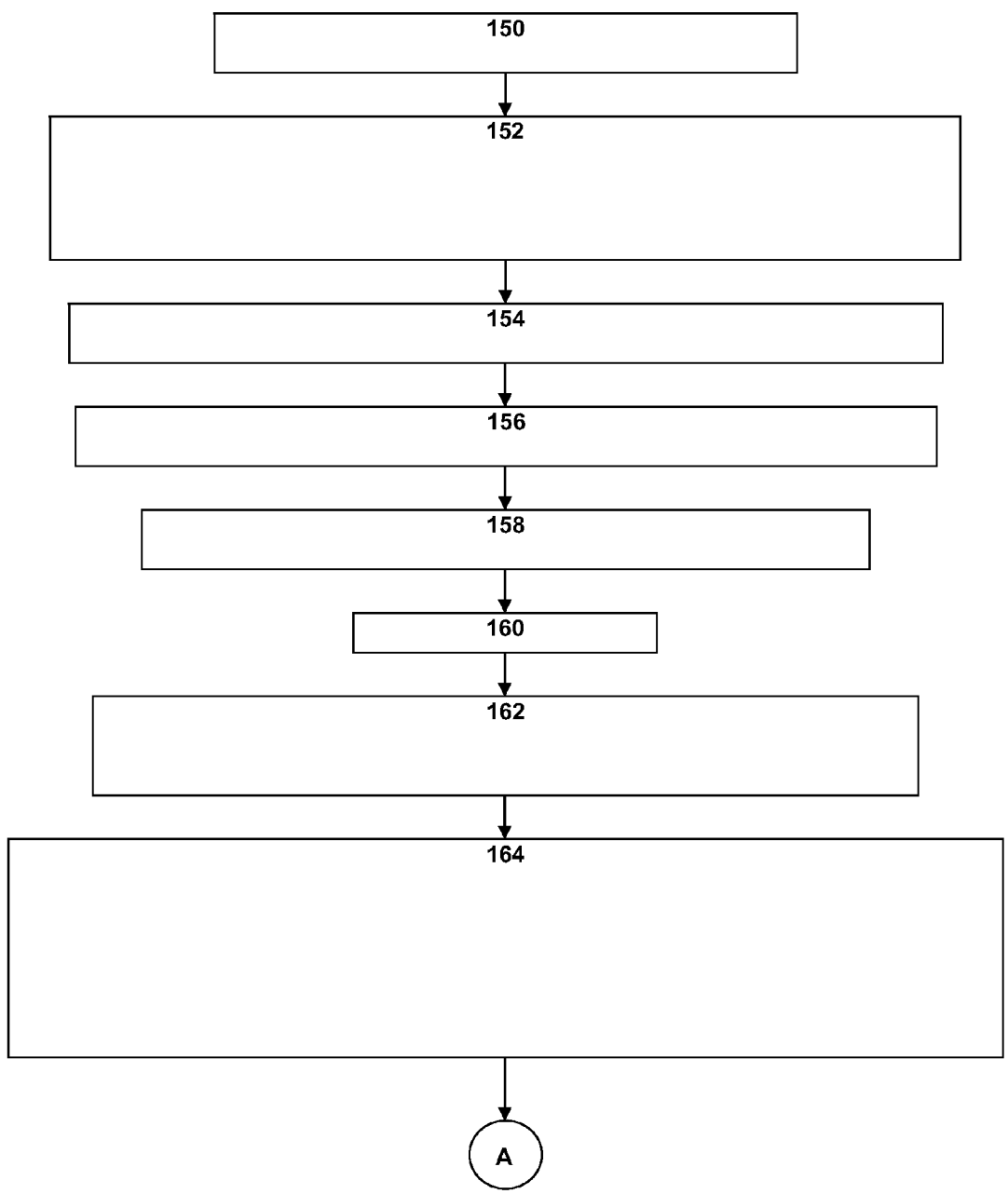
FIG. 19 is a flow chart illustrating a preferred procedure for installation of cathodic protection test leads or associated wiring necessary for the electrical detection of pipeline integrity according to an embodiment of the present invention.
Figure 19:
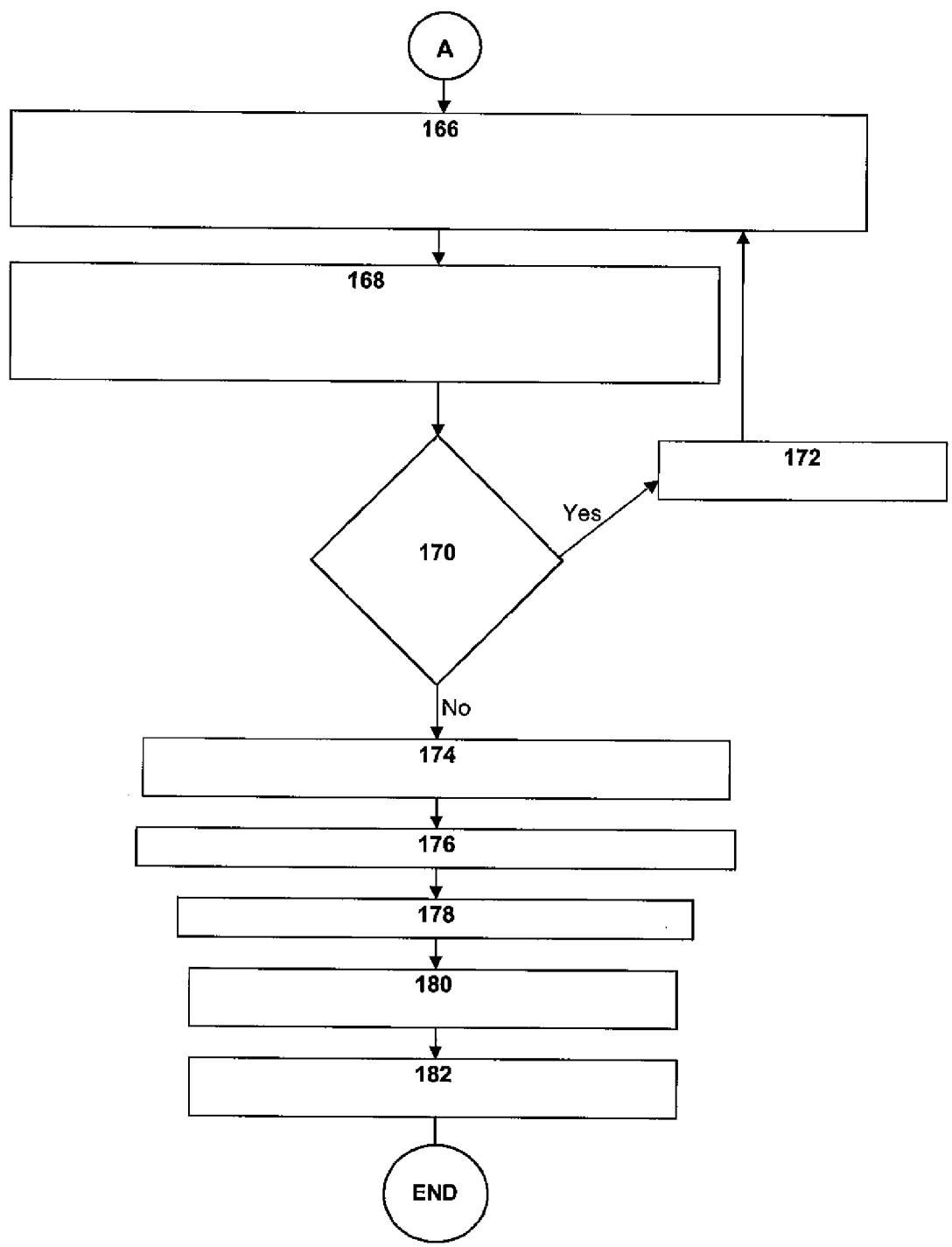

FIGS. 18 and 19 are flow charts which illustrate procedures for two embodiments of methods according to the present invention. In FIG. 18, the steps preferably comprise:

100: Excavate down to the buried pipeline, most preferably with a Hydro Excavation Unit.

102: Insert into riser pipe, gas detection device monitoring and testing for LEL (Lower Explosive Limit) verifying and confirming a safe working environment. At conclusion of test the aforementioned device will be removed from riser pipe.

104: Slot trench, preferably utilizing Hydro Excavation away from pipeline for a distance to be determined by customer.

106: Excavate a hole, preferably using Hydro Excavation, to facilitate burial of Sacrificial Anode/Current Bleed to depth to be determined by customer,

108: Install riser pipe, preferably PVC tubing, which most preferably has a diameter of about 4 to about 24 inches and most preferably about 6 inches, into the primary excavation. Riser pipe is preferably cut to length as requested by customer and either terminated below grade, at grade, or above grade. Riser pipe is preferably cut in a "saddle" configuration to allow for a contour fit to the outside diameter of buried pipeline.

110: Determine the composition of existing coating on pipeline. Select appropriate tool for target area preparation. This can be accomplished with a downhole camera.

112: Insert coating removal tool complete with head, driveshaft, stabilizer couplings, and top stabilizer to prevent deflection of riser pipe during backfill procedure.

114: Backfill around riser pipe using background material or select fill transported to site by crew to the same grade as bottom of slot trench.

116: Remove tool from riser pipe.

118: Verify/test internal and external integrity of pipeline by confirming wall thickness of pipe at specific target area. This test is preferably accomplished by the insertion of an ultra-sonic testing device taking readings through possible existing exterior coating of pipe. At conclusion of test the aforementioned device will be removed from riser pipe.

120: Reinsert coating removal tool. Rotate tooling with a rotational power unit, most preferably an air motor, for the time necessary to remove existing coating and establish a dual anchor pattern, due to a dual elliptical pattern created in the coating by the use of a circular rotating member contacting the top portion of a round pipeline, for satisfactory bonding of thermal weld material. This dual anchor pattern is preferably established in the same location of the prior integrity test.

122: Attach wire to thermal weld mold, lower into riser pipe, position over primary target, remote detonate thermal weld charge, remove tool from riser pipe, verify bonding of wire to pipe utilizing multi-meter checking for continuity. Repeat this process to attach a second wire to the pipeline if desired.

124: Visually inspect integrity of the thermal weld utilizing either a flashlight or if conditions dictate a down hole camera. If visual inspection is hampered due to smoke from the thermal welding process, a vacuum hose can be inserted down into the riser pipe to evacuate the residual smoke and thus enhance visibility of the weld for inspection.

126: Are problems with weld detected?

128: If yes, reinsert coating removal tool to remove thermal weld.

130: If no, coat/seal target areas with a water proofing layer, most preferably a hot wax.

132: If desired, terminate preinstalled wire into machine screws inserted through top of riser pipe.

134: Drill hole through riser pipe, preferably at bottom of slot trench location.

136: Insert leads from sacrificial anode/current bleed through hole, preferably routing to top of riser pipe and connecting to previously installed lugs or screws.

138: Route wiring to sacrificial anode/current bleed through slot trench to previously excavated hole.

140: Drop sacrificial anode/current bleed into secondary excavation.

142: Backfill excavation with wet material from hydro excavation unit to facilitate charging of anode bag, or backfill to customer's specification.

144: Finish backfill around riser pipe in primary excavation and slot trench.

146: Install a sleeve over riser pipe, most preferably a Ultra Violet resistant sleeve.

148: End.

The steps of FIG. 19 preferably comprise:

150: Excavate down to the buried pipeline, most preferably with a Hydro Excavation unit.

152: Install riser pipe, preferably PVC tubing, which most preferably has a diameter of about 4 to about 24 inches and most preferably about 6 inches, into the primary excavation. Riser pipe is preferably cut to length as requested by customer and either terminated below grade, at grade, or above grade. Riser pipe is preferably cut in a "saddle" configuration to allow for a contour fit to the outside diameter of buried pipeline.

154: Determine the composition of existing coating on pipeline. Select appropriate tool for target area preparation. This can be accomplished with a downhole camera.

156: Insert coating removal tool complete with head, driveshaft, stabilizer couplings, and top stabilizer to prevent deflection of riser pipe during backfill procedure.

158: Backfill around riser pipe using background material or select fill transported to site by crew to the same grade as bottom of slot trench.

160: Remove tool from riser pipe.

162: insert into riser pipe, gas detection device monitoring and testing for LEL (Lower Explosive Limit) verifying and confirming a safe working environment. At conclusion of test the aforementioned device will be removed from riser pipe.

164: Verify/test internal and external integrity of pipeline by confirming wall thickness of pipe at specific target area. This test is preferably accomplished by the insertion of an ultra-sonic testing device taking readings through possible existing exterior coating of pipe. At conclusion of test the aforementioned device will be removed with a rotational power unit, most preferably an air motor, for the time necessary to remove existing coating and establish a dual anchor pattern, due to a dual elliptical pattern created in the coating by the use of a circular rotating member contacting the top portion of a round pipeline, for satisfactory bonding of thermal weld material. This dual anchor pattern is preferably established in the same location of the prior integrity test.

166: Attach wire to thermal weld mold, lower into riser pipe, position over primary target, remote detonate thermal weld charge, remove tool from riser pipe, verify bonding of wire to pipe utilizing multi-meter checking for continuity. Repeat this process to attach a second wire to the pipeline if desired.

168: Visually inspect integrity of the thermal weld utilizing either a flashlight or if conditions dictate a down hole camera. If visual inspection is hampered due to smoke from the thermal welding process, a vacuum hose can be inserted down into the riser pipe to evacuate the residual smoke and thus enhance visibility of the weld for inspection.

170: Are problems with weld detected?

172: If yes, reinsert coating removal tool to remove thermal weld.

174: If no, coat/seal target areas with a water proofing layer, most preferably a hot wax.

176: Terminate preinstalled test leads/wires into test station.

178: Reconfirm integrity of wiring utilizing multi-meter.

180: Install a sleeve over riser pipe, most preferably a Ultra Violet resistant sleeve.

182: End.

Although the steps listed describe the most preferred steps and order, the steps need not necessarily be performed in this particular order. In addition, not all of the steps are essential to the method the present invention and thus not every step need be performed in order for desirable results to be obtained.

In one embodiment of the present invention, any of the various elongated tubes of the present invention, including but not limited to shaft 12 (FIG. 1), extensions 18 (FIG. 2), shaft enclosure 24 (FIG. 3), work bit housing 36 (FIG. 7), extension member 38 (FIGS. 10 and 11), top and bottom housings 56 and 58 (FIG. 13), needle scaling tool extensions 74 (FIG. 15A), and elongated handle 98 (FIG. 17) can comprise an internal opening which is communicably attached to a vacuum sweeper or another similar device. Accordingly, dust (including but not limited to Asbestos) and fumes generated when grinding, scaling, welding, and/or performing other work on the buried pipeline can thus be drawn into a vacuum or other equipment such that any noxious and/or toxic fumes can be properly cleaned, treated, and/or contained. In one embodiment, the dust and fumes generated when grinding, scaling, welding, and/or performing other work is preferably passed through a high efficiency particulate air filter. In one embodiment, a line and/or pipe can be provided within the internal void of the various tubes such that power may be delivered to any tool disposed down the riser pipe, including but not limited to the air hoses, electrical lines, and/or hoses.

In one embodiment of the present invention, work can be performed on a buried pipeline without the need for anyone to be physically present at the location of the buried pipeline below ground. In one embodiment, a connection, including an electrical wire can be made to a buried pipeline without the need for anyone to be lowered into an excavated hole. In one embodiment, a user need not physically reach down into the excavated hole. In one embodiment, the present invention is limited to applying only electrical connections to a pipeline and does not include the attachment of pipes or pipe fittings. In one embodiment, the entire method of the present invention is performed without breaching the pipeline. In one embodiment, work is only performed to an exterior of the pipeline. In one embodiment, the method of the present invention can be performed without removal of material from below the buried pipeline. In one embodiment, the thermal weld is accomplished by initiation of an exothermic reaction via an electrical signal which is initiated above ground.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for performing work on a buried first pipe comprising:
    excavating a hole down to the buried first pipe;
    disposing a second pipe in the excavated hole, the second pipe comprising an earth-retaining riser pipe;
    lowering a powered tool having guide plates into the second pipe, the guide plates comprising outside dimensions slightly smaller than an inside diameter of the second pipe such that when the tool is lowered into the second pipe the tool slides directly down the second pipe in a predetermined position with the guide plates disposed in the second pipe;
    removing a protective coating from the first pipe at a location within the second pipe;
    lowering a thermal weld tool having guide plates into the second pipe; and
    making a weld on the first pipe with the thermal weld tool.

2. The method of claim 1 further comprising backfilling around the second pipe.

3. The method of claim 1 wherein the hole is excavated with a hydrovac system.

4. The method of claim 1 wherein the excavated hole has a diameter of less than 24 inches.

5. The method of claim 4 wherein the excavated hole has a diameter of less than 16 inches.

6. The method of claim 5 wherein the excavated hole has a diameter of less than 12 inches.

7. The method of claim 6 wherein the excavated hole has a diameter of less than 8 inches.

8. The method of claim 1 wherein disposing a second pipe comprises disposing a riser pipe having a bottom portion formed to conform to an outside diameter of a top portion of the first pipe.

9. The method of claim 1 further comprising lowering a pipeline integrity sensing tool having guide plates into the second pipe.

10. The method of claim 1 wherein making a weld on the first pipe comprises welding an electrical wire to the first pipe.

11. The method of claim 10 wherein the electrical wire is part of a cathodic protection system.

12. The method of claim 1 wherein during performance of the method the user remains above ground.

13. The method of claim 1 wherein the method is capable of being performed without the need for anyone to lowered into the excavated hole.

14. The method of claim 1 wherein the method is performed without the need for a person to physically reach down in to the excavated hole.

15. A method for performing work on a buried pipeline comprising:
   excavating a hole down to the buried pipeline with a hydrovac unit;
   disposing an earth-retaining riser pipe in the excavated hole;
   lowering a protective coating removal tool having guide plates into the riser pipe, the guide plates comprising outside dimensions slightly smaller than an inside diameter of the riser pipe such that when the tool is lowered into the riser pipe the tool slides directly down the riser pipe in a predetermined position the guide plates disposed above the pipeline;
   removing a protective coating from the pipeline with the tool;
   lowering a thermal weld tool having guide plates into the riser pipe; and
   welding an electrical wire to the pipeline at a location where the protective coating has been removed by the tool.

16. The method of claim 15 further comprising backfilling around the riser pipe.

17. The method of claim 15 wherein excavating a hole comprises excavating a hole having a diameter of less than 16 inches.

18. The method of claim 15 wherein disposing a riser pipe comprises disposing a riser pipe having a bottom portion formed to conform to an outside diameter of a top portion of the pipeline.

19. The method of claim 15 further comprising lowering a pipeline integrity sensing tool into the riser pipe.

20. The method of claim 15 wherein during performance of the method the user remains above ground.

21. The method of claim 15 wherein the method is capable of being performed without the need for any person to be lowered into the excavated hole.

22. The method of claim 15 wherein lowering a protective coating removal tool having guide plates into the riser pipe comprises lowering a rotational multi-use tool having guide plates.

23. The method of claim 15 wherein lowering a protective coating removal tool having guide plates into the riser pipe comprises lowering a needle scaling tool having guide plates.

24. The method of claim 15 wherein lowering a protective coating removal tool having guide plates into the riser pipe comprises lowering a sandblasting nozzle having guide plates.

25. A method for performing work on a buried first pipe comprising:
   excavating a hole having a diameter of less than 16 inches down to the buried first pipe;
   disposing second pipe in the excavated hole, the second pipe comprising an earth-retaining riser pipe;
   lowering a powered tool having one or more guide plates attached thereto down within the second pipe to the first pipe, the one or more guide plates comprising outside dimensions slightly smaller than an inside diameter of the second pipe such that when the tool is lowered into the second pipe the tool slides directly down the second pipe in a predetermined position with the guide plates are disposed above the first pipe and inside of the second pipe; and
   performing work on the first pipe without the need for any person to be lowered into the excavated hole.

26. The method of claim 25 wherein the hole is excavated with a hydrovac unit.

27. The method of claim 25 wherein the powered tool removes a coating from the buried first pipe.

28. The method of claim 25 wherein the powered tool comprises a sandblasting nozzle which removes a coating from the buried first pipe.

* * * * *